Sept. 7, 1926. 1,598,863
H. C. HANSON
BURNER FOR LIQUID FUEL LAMPS
Filed Sept. 27, 1924
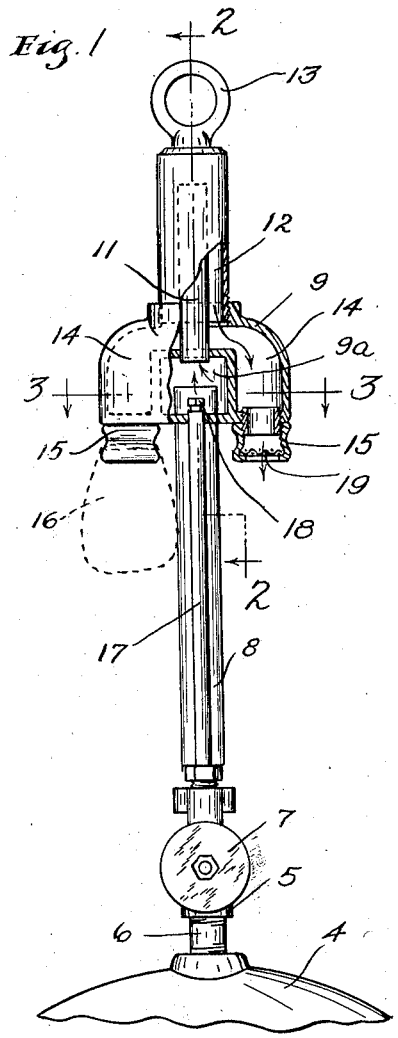
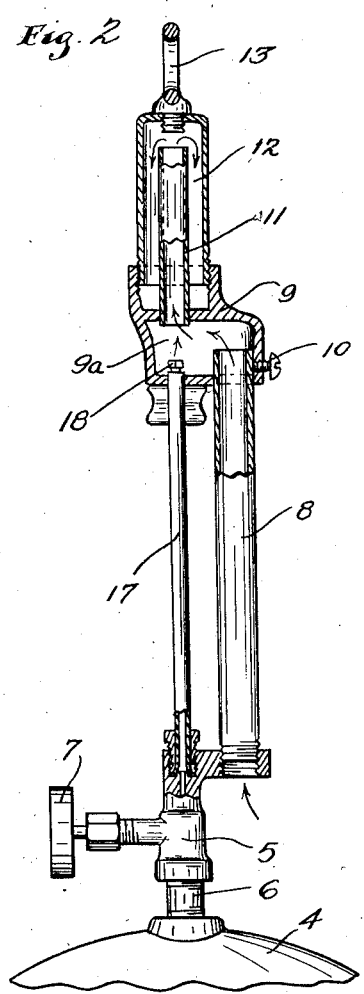
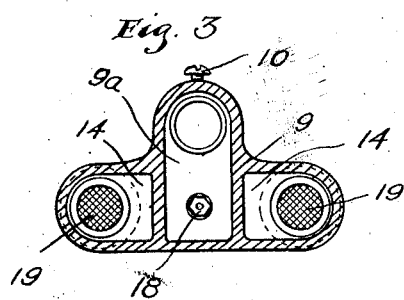
INVENTOR,
HANS C. HANSON.
BY HIS ATTORNEY,
James F. Williamson Patented Sept. 7, 1926.

1,598,863

UNITED STATES PATENT OFFICE.

HANS C. HANSON, OF ALBERT LEA, MINNESOTA, ASSIGNOR TO AMERICAN GAS MACHINE COMPANY, OF ALBERT LEA, MINNESOTA, A CORPORATION OF MINNESOTA.

BURNER FOR LIQUID-FUEL LAMPS.

Application filed September 27, 1924. Serial No. 740,255.

This invention relates to a lamp construction and particularly to lamps using fuel vapor, such as the vapor from gasoline or kerosene. While the invention might be applicable to various types of lamps it is particularly designed for lamps using the well known gas mantles. Such lamps usually have the the fuel supplied under pressure and this fuel is directed into an air mixing chamber through a nozzle having a small orifice. Where a plurality of mantles are used difficulty has been experienced in getting an equal distribution of the fuel to the mantles. If the nozzle, in assembling, was tilted or directed slightly to one side or if a small piece of dirt became lodged in the mantle so as to direct the stream of fuel to one side, one of the mantles would receive more fuel than the other thus causing unequal combustion and illumination in the mantles. This was objectionable both from an illumination standpoint and on account of some of the mantles being quickly burned out.

It is an object of this invention, therefore, to provide a structure of burner having means for insuring an equal distribution of the fuel and fuel mixture to the mantles.

It is a further object of this invention to provide a burner having a chamber for the fuel mixture having passages leading to the burners or mantles, together with means disposed in said chamber into which the fuel is directed for delivering said fuel equally to a portion of said chamber.

It is more specifically an object of the invention to provide a burner having a body with passages therein leading to the mantles and having an upwardly extending chamber communicating with said passages, together with a tube disposed in said chamber and terminating near the upper end thereof, together with means for supplying fuel and air to the lower portion of said tube.

These and other objects and advantages of the invention will be fully set forth in the following description made in connection with the accompanying drawings in which like reference characters refer to the same parts throughout the different views, and in which, Fig. 1 is a view in front elevation of the invention, a portion of the parts being broken away and others shown in vertical section;

Fig. 2 is a view in side elevation of the device, certain parts being broken away and others shown in vertical section on line 2—2 of Fig. 1; and Fig. 3 is a horizontal section taken on the line 3—3 of Fig. 1.

Referring to the drawings, a portion of a fuel tank is indicated as 4. A valve body 5 is connected to the tank 4 by means of a short nipple 6 and contains a valve operated by the wheel 7 for regulating the amount of fuel supplied from the tank 4. The valve body 5 has a laterally extending lug apertured and threaded to receive the lower end of an upwardly extending pipe or conduit 8, open at its lower end and secured at its upper end in a burner body 9 having a laterally directed portion for receiving the pipe 8, said pipe preferably being held in place in said body 9 by a set screw 10. The pipe 8 may be threaded into the body 9 or secured therein in any other suitable manner. The body 9 has a chamber 9ª in its lower portion with which the upper end of pipe 8 communicates and a tube 11 extends from the upper wall of chamber 9ª into a vertically extending chamber 12. In the construction of the device illustrated, the chamber 12 is formed in a cylindrical shell threaded into the top of the body 9, said shell being shown as having an apertured handle member 13 secured in its top portion. The tube 11 terminates adjacent the top of the chamber 12 and, as shown in Fig. 1, said chamber 12 communicates with a plurality of passages 14 formed in the body 9 at each side of chamber 9ª, which passages extend downward and have mantle receiving portions 15 secured at their lower ends and communicating therewith. The members 15 are shown as having a screen diaphragm 19 in their lower ends. A mantle 16 is indicated in dotted lines in Fig. 1. A small pipe 17 is secured in the top of the valve body 5 and extends upwardly into the chamber 10 between the members 15, and said pipe having a small nozzle 18 in its upper end provided with a small central aperture through which the fuel is projected upwardly into the tube 11.

In operation, the fuel from the fuel tank 4 is usually placed under pressure by means of an air pump or other means and is projected upwardly through the tube 17 and nozzle 18 in an exceedingly fine jet into the tube 11. This fuel is vaporized and passes out of the top of tube 11 into the chamber 12. The air is simultaneously drawn into the burner through the pipe 8 and mixes with the fuel passing through tube 11 and chamber 12. The mixture passes downwardly from chamber 12 through passages 14 to the mantles on the members 15 where it is burned. With the use of tube 11 it will be seen that even if the nozzle 18 is directed to one side in mounting or if the jet of fuel is directed to one side by an obstruction, yet the fuel will be delivered centrally of the chamber 12 at the upper end thereof. The laterally directed jet will merely strike the wall of tube 11 and will be directed centrally upwardly. Where, as in the prior art, there has merely been a chamber directly over the passages 14, if the jet of fuel was directed laterally more fuel would be supplied to one mantle than the other. This objectionable operation has been eliminated in applicant's structure. The combustible mixture is delivered equally to the mantles and delivered to said mantles with the same pressure.

From the above description it is seen that applicant has provided a simple and efficient structure of burner insuring an equal distribution of fuel under equal pressure to the burner or mantles. The device has been amply demonstrated in actual practice and found to be very successful and the same is being commercially made.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claim.

What is claimed is:

A burner for use with depending mantles having in combination a burner body comprising spaced apertures in its lower side for receiving gas mantles, said body having passages leading upwardly through said openings to a common inlet, a tube secured in said inlet and extending upwardly therefrom, closed at its upper end and having an unobstructed interior, a chamber in said body between said passages, a comparatively small open ended tube disposed substantially centrally in said first mentioned tube, terminating below the top of the latter and extending into the top of said chamber, a fuel supplying tube extending into the lower side of said chamber, in alinement with said small tube, an air supplying tube secured to said body, extending into said chamber and supporting said body, a member disposed a considerable distance below said burners, supporting said air supplying tube at its lower end, said lower end being open, said member also supporting said fuel supplying tube whereby air is supplied to said chamber without causing a draft in the vicinity of said mantles which would objectionably affect them.

In testimony whereof I affix my signature.

HANS C. HANSON.